(12) United States Patent
Wegner et al.

(10) Patent No.: US 7,871,487 B1
(45) Date of Patent: Jan. 18, 2011

(54) METHOD FOR FABRICATING GRID-STIFFENED COMPOSITE STRUCTURES

(75) Inventors: Peter M. Wegner, Tijeras, NM (US); Jeffrey M. Ganley, Albuquerque, NM (US); Brice A. Johnson, Federal Way, WA (US); Barry P. Van West, Bellevue, WA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 231 days.

(21) Appl. No.: 12/332,334

(22) Filed: Dec. 10, 2008

Related U.S. Application Data

(62) Division of application No. 11/239,453, filed on Sep. 27, 2005, now Pat. No. 7,479,201.

(51) Int. Cl.
| | |
|---|---|
| *B29C 53/80* | (2006.01) |
| *B29C 53/58* | (2006.01) |
| *B29C 70/86* | (2006.01) |
| *B29C 69/00* | (2006.01) |
| *B29C 45/14* | (2006.01) |
| *B65H 81/00* | (2006.01) |
| *B29D 22/00* | (2006.01) |
| *B32B 27/00* | (2006.01) |
| *B32B 37/24* | (2006.01) |
| *B28B 7/22* | (2006.01) |
| *B27N 3/10* | (2006.01) |

(52) U.S. Cl. .................. 156/242; 156/169; 156/170; 156/171; 156/172; 156/173; 156/174; 156/175; 264/255; 264/257

(58) Field of Classification Search ......... 156/169–175, 156/242; 264/255, 257
See application file for complete search history.

(56) References Cited

U.S. PATENT DOCUMENTS 6,007,894 A    12/1999    Barnes et al.

(Continued)

OTHER PUBLICATIONS

B. Van West and P. M. Wegner, "Fiber-placed Composite Grid-stiffened Structures," Proceedings of the Society for Advanced Material and Processing Engineers International Technical Conference (Seattle, Washington, Nov. 2002).

(Continued)

*Primary Examiner*—Philip C Tucker
*Assistant Examiner*—Michael N Orlando
(74) *Attorney, Agent, or Firm*—James M. Skorich

(57) ABSTRACT

A method for fabricating a grid-stiffened structure from fiber-reinforced composite materials. Ribs are formed on a smooth hard base tool. Expansion blocks are placed in the shallow cavities formed by the ribs and the base tool, and held in place by one of several means while a skin is placed over the ribs, expansion blocks, and base tool. The assembly is then placed in a vacuum bag and autoclave cured. After cooling, the formed structure is separated from the base tool and the expansion blocks are removed from the cavities. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims.

7 Claims, 2 Drawing Sheets

U.S. PATENT DOCUMENTS

| | | | |
|---|---|---|---|
| 6,050,315 | A | 4/2000 | Deckers et al. |
| 6,149,851 | A | 11/2000 | Deckers et al. |
| 6,245,274 | B1 | 6/2001 | Huybrechts et al. |
| 6,290,799 | B1 | 9/2001 | Deckers et al. |

OTHER PUBLICATIONS

C. Collier, P. Yarrington and B. P. Van West, "Composite Grid-Stiffened Panel Design for Post Buckling Using Hypersizer," Proceedings of the 43rd AIAA/ASME/ASCE/AHS/ASC Structures, Structural Dynamics and Materials Conference, AIAA-2002-1222, American Institute of Aeronautics and Astronautics, Inc. (Denver, Colorado, Apr. 22-25, 2002).

P. M. Wegner, J. E. Higgins and B. P. Van West, "Application of Advanced Grid-Stiffened Structures Technology to the Minotaur Payload Fairing," Proceedings of the 43rd AIAA/ASME/ASCE/AHS/ASC Structures, Structural Dynamics and Materials Conference, AIAA 2002-1336, American Institute of Aeronautics and Astronautics, Inc. (Denver, Colorado, Apr. 22-25, 2002).

S. M. Huybrechts, T. E. Meink, P. M. Wegner and J. M. Ganley, "Manufacturing theory for advanced grid stiffened structures," Composites Part A: Applied Sciences and Manufacturing, vol. 33, Issue 2, pp. 155-161, Elsevier Science Ltd. (Feb. 2002).

P. M. Wegner, J. M. Ganley, S. M. Huybrechts and T. E. Meink, "Advanced Grid Stiffened Composite Payload Shroud for the OSP Launch Vehicle," Proceedings of the 2000 IEEE Aerospace Conference, vol. 4, pp. 359-365 (Mar. 2000).

METHOD FOR FABRICATING GRID-STIFFENED COMPOSITE STRUCTURES

CROSS-REFERENCE TO RELATED APPLICATION

This application is a divisional of pending U.S. patent application Ser. No. 11/239,453 filed on Sep. 27, 2005, now U.S. Pat. No. 7,479,201, and claims the benefit of the foregoing filing date.

STATEMENT OF GOVERNMENT INTEREST

The invention described herein may be manufactured and used by or for the Government for governmental purposes without the payment of any royalty.

FIELD OF THE INVENTION

The present invention is related to the field of fabricating structures having a composite face-sheet reinforced with composite ribs. More specifically, the invention is a method for fabricating such structures by inserting expansion blocks in between the uncured ribs, then removing the blocks after the structure has been cured and removed from a hard base tool.

BACKGROUND OF THE INVENTION

Grid-stiffened structures are used in a wide variety of applications and configurations. These structures typically consist of a thin skin, or face-sheet, integrally connected to a series of rib or blade stiffeners. The face-sheet can be placed on either the internal or external portion of the structure. The rib-stiffeners typically form repeating patterns that create either rectangular or triangular cavities in the structure. Traditionally, these types of structures were machined from thick sheets of metallic material using large multi-head milling machines. Thus, a large portion of the metallic material was wasted as scrap.

Fiber-reinforced polymer composite materials can be used to make grid-stiffened structures that are more efficient than comparable metallic grid structures because the ribs can be made of unidirectional laminates. Hence, all of the fibers are oriented to run axially along the length of the ribs. The direction in which the highest stresses typically occur thus corresponds to the direction of highest strength and stiffness of the material.

The foregoing are known as advanced grid-stiffened structures, and their use has gained in popularity during the last decade because they eliminate or reduce the primary problems associated with honeycomb sandwich structures. More particularly, moisture uptake is a well-known problem for honeycomb panels because water tends to become trapped in the hexagonal cells of the honeycomb and causes corrosion and softening of the composite face-sheets. In contrast, grid-stiffened panels do not trap water since the panel has skin on one side only. A second critical problem with structures made of honeycomb sandwich panels is that a large amount of time is required to cut and splice the honeycomb core to fit on shapes having complex curvatures, such as aircraft fuselages and rocket payload fairings. This results in a high cost and a long lead-time for these structures. However, grid-stiffened panels can be manufactured using an almost entirely automated process. This may result in a cost savings of nearly 20% over a comparable honeycomb sandwich shroud.

A number of previous patents have been awarded for the fabrication of grid-stiffened composite structures. U.S. Pat. No. 6,007,894 teaches a technique for fabricating a grid-stiffened composite structure using a hand lay-up process.

U.S. Pat. No. 6,245,274 discloses a method for manufacturing advanced grid-stiffened structures that utilizes hybrid tooling. This method uses a rigid base tool to provide for the geometric shape and dimensional tolerance of the structure. Softer expansion tooling blocks having a high coefficient of thermal expansion are placed into grooves in the base tool. The tooling blocks have smaller grooves that fit around the uncured ribs and provide consolidation pressure on the structure during oven or autoclave curing. Either a filament winding machine or a fiber placement machine can be used to place the uncured tows of fiber into the grooves in the soft expansion tooling blocks.

U.S. Pat. No. 6,290,799 teaches a method for fabricating grid-stiffened structures utilizing a fiber placement machine. The foregoing method utilizes a rigid base tool with soft triangular-shaped expansion blocks where the expansion blocks are fastened to the base tool by pins at each of the corners. This reference discusses the possibility of placing the skin on both the inside and outside of the stiffening ribs. When the skin is found on the inside of the ribs, the skin is placed first on the bare base tool, then the uncured ribs are placed, and finally the expansion blocks are connected to a caul sheet that is then placed around the part for curing.

Each of these previously disclosed methods of fabricating grid stiffened structures has inherent problems that make it too costly and complex to be competitive with traditional sandwich panel structures. For example, the hybrid expansion approach disclosed in U.S. Pat. No. 6,245,274 relies on a very complex base tool and matching set of expansion blocks. Once the base tool is fabricated, it is very difficult using this method to alter the location of the stiffening ribs to accommodate things such as windows, doors, and access panels. The complexity of the base tool makes it expensive and time consuming to fabricate, and the process of placing the individual expansion blocks into the grooves in the base tool is labor intensive. These factors detract from the suitability of using this method to fabricate very large structures such as aircraft fuselages and rocket payload fairings.

The hand lay-up fabrication method disclosed by U.S. Pat. No. 6,007,894 has the disadvantage of being useable only to make fairly small structures. Further, this method requires the use of skilled labor, which obviously increases the fabrication cost.

The process disclosed in U.S. Pat. No. 6,290,799 requires the expansion tooling blocks to be rigidly connected to either the base tool by pins or to the top caul sheet by adhesive or a co-cured bond. The problem with this approach is that the when the expansion tooling is rigidly constrained, a differential pressure along the length of the ribs is created during the curing process. This differential pressure can create variations in the thickness of the ribs as well as variations in porosity along the length of the ribs. These factors reduce the efficiency of the structure and render this manufacturing method undesirable.

There is a need in the art for a method of fabricating grid-stiffened structures that is lower in cost and less complex than the methodology of the prior art, as well as capable of producing structures with supporting ribs having constant thickness and porosity. The present invention fulfills this need in the art.

SUMMARY OF THE INVENTION

Briefly, carbon-fiber tows that have been impregnated with an uncured matrix material are stacked on a smooth hard base tool to form uncured ribs. Next, expansion blocks are placed on the hard base tool, in the shallow cavities formed by the ribs and the base tool. A contact adhesive holds them in place. An uncured skin is then placed over the grid structure. The entire assembly, now including the skin, is placed in a vacuum bag and cured in an autoclave or oven.

The contact adhesive retains its tack at room temperature, but becomes a crystalline substance at the elevated temperature of the curing cycle. This allows the adhesive to keep the expansion blocks in place while the skin is being placed over the assembly, but then crystallizes at the elevated curing temperatures to allow the expansion blocks to freely expand during the curing cycle to squeeze the ribs between complimentary blocks with uniform pressure. Once the grid-stiffened structure has been cured and cooled, it is split and removed from the hard base tool. The expansion blocks are then removed from the two pieces of the split structure, and the final structure formed by re-joining the split pieces.

Other means of holding the expansion blocks in place can be utilized, such as vacuum pressure, friction, magnetic force, an over-wrap of a disposable material, or mechanical fasteners. Common to these means is that they allow the expansion blocks to freely expand to squeeze the ribs located in between complimentary expansion blocks with uniform pressure along their lengths, when the assembly exposed to the elevated temperature of the curing cycle. Therefore, if a vacuum or magnetic force is applied, it is turned off during the curing cycle. If a mechanical connection such as a pin fastener is utilized that cannot be "turned off," then each expansion block is connected only at its center of gravity. This allows the expansion blocks to expand nearly equally in all directions, thus minimizing any differential in the pressure being applied by the expansion blocks along the length of each of the ribs during the curing process.

Other aspects and advantages of the present invention will become apparent from the following detailed description, taken in conjunction with the accompanying drawings, and illustrating by way of example the principles of the invention.

DETAILED DESCRIPTION

Figure 1:
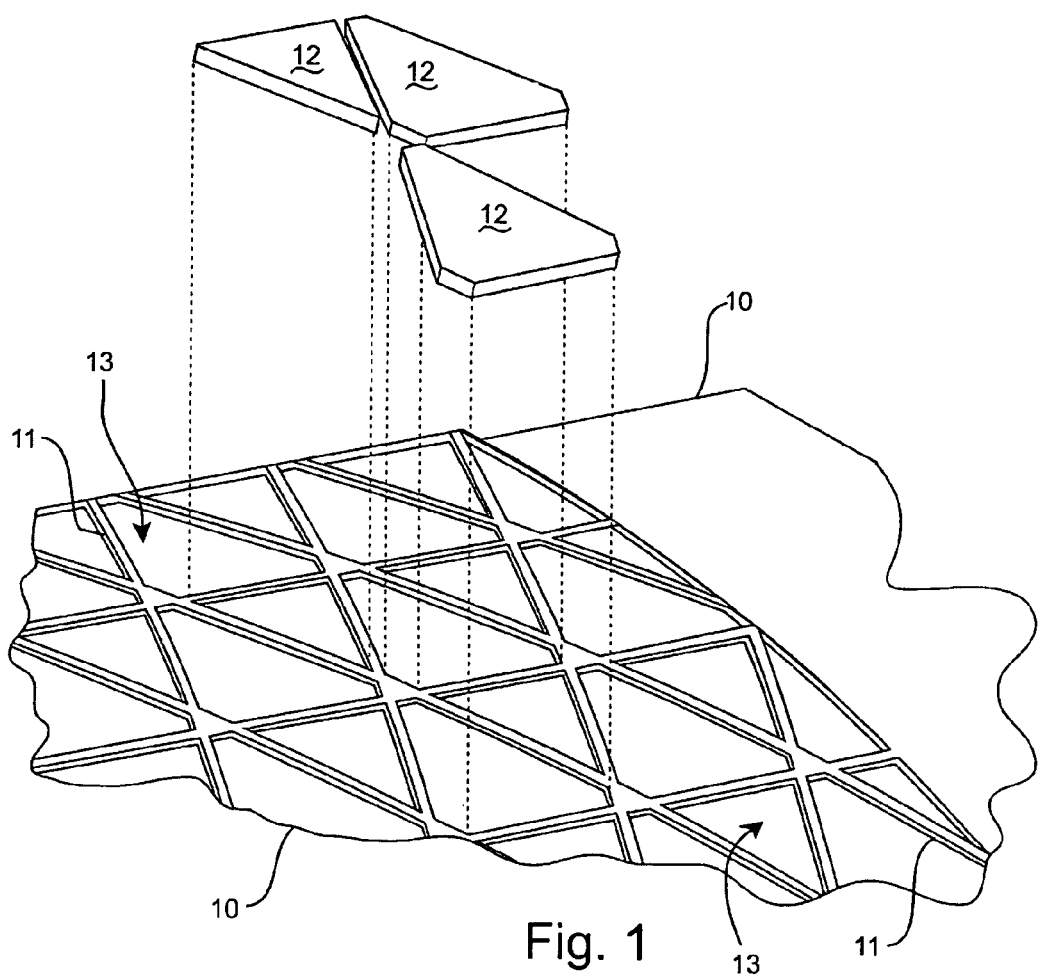
FIG. 1 is an isometric drawing illustrating the placement of expansion blocks into the shallow cavities formed by uncured ribs lying on the smooth surface of a hard base tool.

Hard base tool 10 having the general shape of the desired structure is first fabricated. Base tool 10 has a smooth surface and provides a platform for the ribs to be placed upon. The material selected for base tool 10 must be machinable, thermally stable, and lightweight; for example, particleboard, expansion foam, expansion epoxy, aluminum and graphite.

Ribs 11 are formed by stacking layers of carbon-fiber tows that have been impregnated with an uncured epoxy matrix material, also known as "tow-preg." Tow-preg comes in many combinations of fiber and matrix material, and in various sizes such as 12K tow (12,000 fibers per tow), 5K tow (5,000 fibers per tow) and split tape (typically 0.125" in width and 0.005" thick). However, many different fibers can be utilized in conjunction with the present invention, such as glass fibers, aramid fibers, or boron fibers. Moreover, these fibers can be combined with a variety of matrix materials, such as polyimides, polyesters, cyanate esters, or thermoplastics such as PEEK™ and polysulfone. (PEEK is a trademark owned by Victrex U.S.A., Inc., of Greenville, S.C.)

Ribs 11 can be formed by stacking the fiber tows using an automated tape placement machine, a filament winding machine, or manually. Ribs 11 are typically stacked in a "free-standing" configuration on the smooth base tool 10 until the desired rib height and configuration is obtained. Ribs 11 are three tows wide (0.325") and 0.72" in height. However, the present invention can be used with a rib width having as many tows as is desired. The fiber tows are stacked in a configuration such that ribs 11 are interwoven layer by layer.

After ribs 11 have been stacked to their desired height and width, expansion blocks 12 are placed between them and abutting base tool 10, i.e., in shallow cavities 13. Expansion blocks 12 must have a large coefficient of thermal expansion and be nearly incompressible so that at the elevated temperatures during the curing process (another step of the present invention that will be discussed infra), expansion blocks 12 expand and squeeze each of ribs 11 located in between a complimentary pair of expansion blocks 12, with a pressure that is nearly uniform along the length of each rib 11. U.S. Pat. No. 6,245,274 teaches a method for sizing expansion blocks so that that their expansion during the curing process creates the lateral squeezing pressure necessary to properly form the ribs.

It has been found that expansion blocks 12 satisfy the aforementioned performance criteria when cast from room temperature vulcanizing silicon rubber. This material has a high coefficient of thermal expansion ("CTE"), is nearly incompressible, and readily releases from the cured matrix material. Casting the expansion blocks from moderately high CTE polytetrafluoroethylene, such as TEFLON®, has also been successfully used in conjunction with the present invention for forming some particular structural configurations. (TEFLON is a registered trademark owned by DuPont.)

The side of each of expansion blocks 12 that comes in contact with base tool 10 is coated with a synthetic elastomer-based adhesive, such SUPER 77® spray adhesive. (SUPER 77 is a registered trademark owned by 3M Corporation.) This ensures that expansion blocks 12 remain attached to hard base tool 10 while skin 14 is subsequently placed over ribs 11 in the next step of the invented method. SUPER 77® spray adhesive has a unique property in that at room temperature it has a peel-strength of 160 psi, but at higher temperatures it loses its strength and turns into a crystalline substance. For example, at 120° F. the peel-strength of this adhesive is 65 psi. After being subject to a cure cycle of 350° F. for 6 hours, SUPER 77® spray adhesive does not have any tackiness to the touch and has lost all peel strength.

Consequently, at room temperature, expansion blocks 12 are held fast to hard base tool 10; but during the curing cycle, the adhesive loses its strength and allows expansion blocks 12 to uniformly expand and apply a uniform compressive force against each of ribs 11 located between complimentary expansion blocks 12. This physical property also allows expansion blocks 12 to be easily removed from cavities 13 after the curing step, in the penultimate step of the present invention that will also be discussed infra.

In another embodiment of the present invention, each expansion block 12 is fastened to hard base tool 10 with a pin at its center of mass. This allows unconstrained radial expansion of the block from its center of mass, and thus ensures the application of a uniform lateral pressure along the length of each of ribs 11 during the curing cycle. In yet another embodiment, expansion blocks 12 are held to hard base tool 10 using a vacuum channel carved into the base tool 10. The creation of a vacuum in the channels after placement of expansion blocks 12 over the various channels holds expansion blocks 12 in place against base tool 10 while skin 14 is being placed over ribs 11. The vacuum is released during the curing cycle to allow expansion blocks 12 to expand without constraint, thereby minimizing any differential in the lateral pressure being applied along the length of each of ribs 11.

A further embodiment is to imbed ferrous particles throughout expansion blocks 12, and fabricate hard base tool 10 from a ferrous material. The application of an electromagnetic field creates an attractive force between a ferrous base tool 10 and the foregoing expansion blocks 12. Again, as with the previously mentioned alternatives, the electro-magnetic field is turned off during the curing cycle to avoid the asymmetrical expansion of expansion blocks 12 causing an uneven pressure distribution along the length of ribs 11.

In another embodiment, a band of material or a thin film such as plastic shrink-wrap is used to wrap the assembly comprised of hard base tool 10, ribs 11 and expansion blocks 12. The shrink-wrap holds expansion blocks 12 in place against base tool 10 until it is replaced with skin 14. An automated procedure may used to remove only as much of the shrink-wrap material as can be replaced by skin 14. For example, if skin 14 is being wound around the assembly by a fiber placement machine, the machine could be programmed to remove a band of the shrink-wrap material as it simultaneously replaces it with a band of skin 14 having the same width. Thus, expansion blocks 12 would always be held rigidly to hard base tool 10 by either the shrink-wrap or skin 14.

As previously noted, after expansion blocks 12 have been placed upon base tool 10 in cavities 13, skin 14 is placed over the assembly comprised of base tool 10, ribs 11 and expansion blocks 12. Skin 14 is fabricated from tows of carbon fiber impregnated with an epoxy matrix material. However, skin 14 could also be composed from a wide variety of material types. For example, skin 14 could be fabricated from split tape, woven cloth, or a tape impregnated with any of a variety of matrix materials.

Alternatively, skin 14 could be placed on hard base tool 10 first. Then, ribs 11 would be formed on top of skin 14 and expansion blocks would subsequently be placed against skin 14 in the shallow cavities formed between skin 14 and ribs 11. This would, of course, result in a structure in which skin 14 lies on the inside of ribs 11, rather than on the outside.

Figure 2:
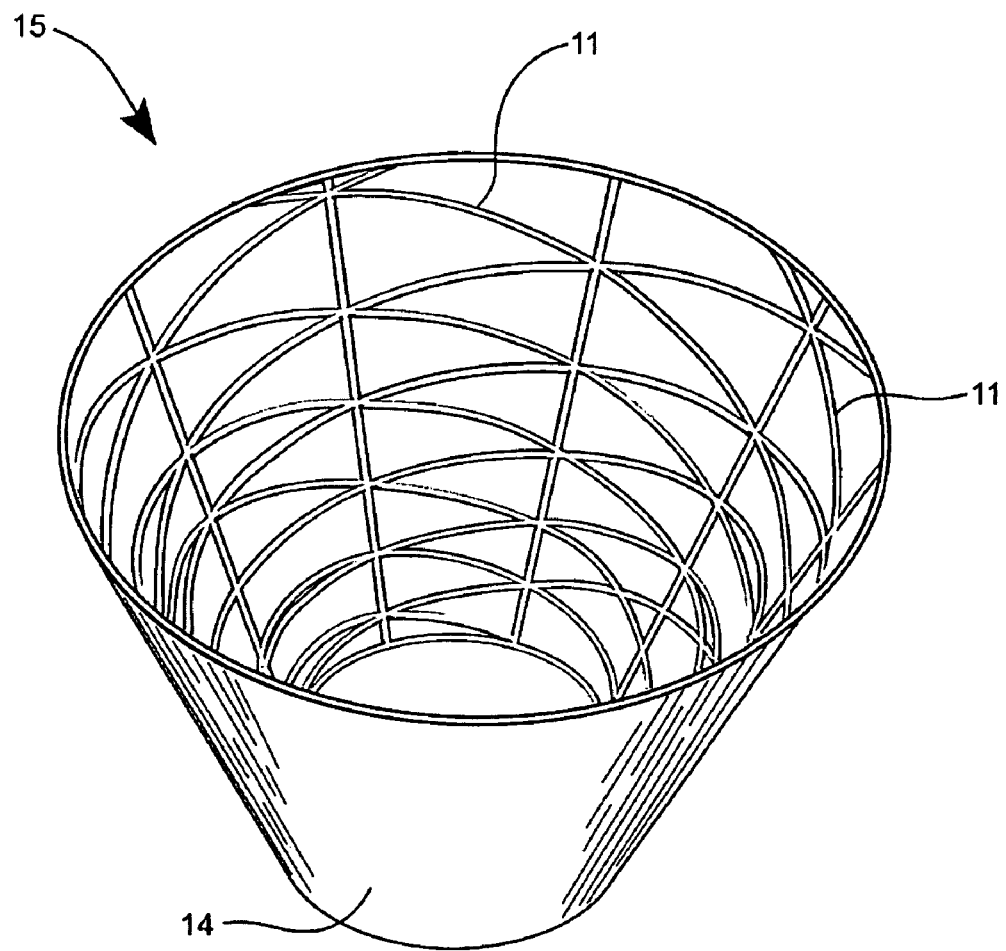
FIG. 2 is an isometric drawing illustrating a grid-stiffened structure having its skin on the outside, as formed using the method of the present invention.

After skin 14 is has been placed over the assembly comprised of hard base tool 10, ribs 11 and expansion blocks 12, the entire assembly, now including skin 14, is placed in a vacuum bag and autoclave cured using standard composite processing techniques. After completion of the curing cycle, the entire assembly is cooled to room temperature and removed from the autoclave. The assembly comprised of ribs 11, expansion blocks 12 and skin 14 is then split in half and removed from hard base tool 10. Expansion blocks 12 are then removed from cavities 13, leaving the completed halves of the grid-stiffened structure. As shown in FIG. 2, rejoining the split halves results in grid-stiffened structure 15.

The present invention can be utilized to build a wide variety of rib and skin configurations. The ribs can form repeated triangular, rectangular, or even circular patterns. The resulting structures can be used in aircraft fuselages, aircraft wings, rocket payload fairings, inter-stage rings for rockets, container boxes, automobile structures, or anywhere that a lightweight, stiff, strong and low-cost structure would prove beneficial.

There are, several significant benefits attendant to fabricating grid-stiffened structures, such as structure 15, using the disclosed invention. Firstly, the geometry and location of ribs 11 can be easily changed simply by placing, ribs 11 in different locations on hard base tool 10 and then providing expansion blocks 12 of the correct size and shape to yield the desired cured shape. In addition, the configuration of hard base tool 10 is very simple and thus relatively inexpensive to make.

Furthermore, several of the steps lend themselves to automation. For example, when a fiber placement machine or filament winding machine is utilized to form and place ribs 11 on hard base tool 10 and to subsequently apply skin 14 over the resulting assembly, the only part of the process that requires manual labor is to place expansion blocks 12 between ribs 11, i.e., into cavities 13. The latter step can be accomplished with unskilled labor. Consequently the cost of producing a grid-stiffened structure with the present invention is less costly than the methods of the prior art, and the structure can be easily tailored for a particular application.

It is to be understood that the preceding is merely a detailed description of a method of this invention, and that numerous changes to the disclosed method can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A method for making a grid-stiffened structure comprising:
    forming ribs by situating an uncured material on a hard base tool so that cavities are formed by the ribs and the hard base tool;
    placing at least one expansion block in each of a plurality of the cavities, and in contact with the hard base tool;
    maintaining contact between the expansion blocks and the hard base tool by applying a shrink-wrap;
    removing the shrink-wrap immediately before applying a skin over the ribs and the expansion blocks; and
    curing an assembly including the ribs, the expansion blocks and the skin by heating the assembly, so that the expansion blocks expand and laterally compress the ribs, whereby
    a grid-stiffened structure is formed by the skin being attached to the cured ribs.

2. A method for making a grid-stiffened structure as recited in claim 1 wherein:
    the skin and the shrink-wrap are each comprised of bands; and
    the shrink-wrap removal step includes successively replacing each band of shrink-wrap with a corresponding band of skin.

3. A method for making a grid-stiffened composite structure as recited in claim 1 further comprising:
    after the curing step, separating the skin, the ribs, and the expansion blocks from the hard base tool; and
    removing the expansion blocks from the grid-stiffened structure.

4. A method for making a grid-stiffened composite structure as recited in claim 3 wherein the expansion blocks are composed of a material selected from the group consisting of room temperature vulcanizing silicon rubber, aluminum, and polytetrafluoroethylene.

5. A method for making a grid-stiffened structure comprising:

forming ribs by situating an uncured material on a hard base tool so that cavities are formed by the ribs and the hard base tool;

placing at least one expansion block in each of a plurality of the cavities, and in contact with the hard base tool;

mechanically fastening the expansion blocks to the hard base tool at a center of gravity for each of the expansion blocks;

applying a skin over the ribs and the expansion blocks; and curing an assembly including the ribs, the expansion blocks and the skin by heating the assembly, so that the expansion blocks expand and laterally compress the ribs, whereby a grid-stiffened structure is formed by the skin being attached to the cured ribs.

6. A method for making a grid-stiffened composite structure as recited in claim 5 further comprising:

after the curing step, separating the skin, the ribs, and the expansion blocks from the hard base tool; and removing the expansion blocks from the grid-stiffened structure.

7. A method for making a grid-stiffened composite structure as recited in claim 5 wherein the expansion blocks are composed of a material selected from the group consisting of room temperature vulcanizing silicon rubber, aluminum, and polytetrafluoroethylene.

* * * * *